No. 676,535. Patented June 18, 1901.
S. ELLIOTT.
DEVICE FOR COUPLING BICYCLES.
(Application filed Dec. 6, 1897.)
(No Model.) 4 Sheets—Sheet 4.
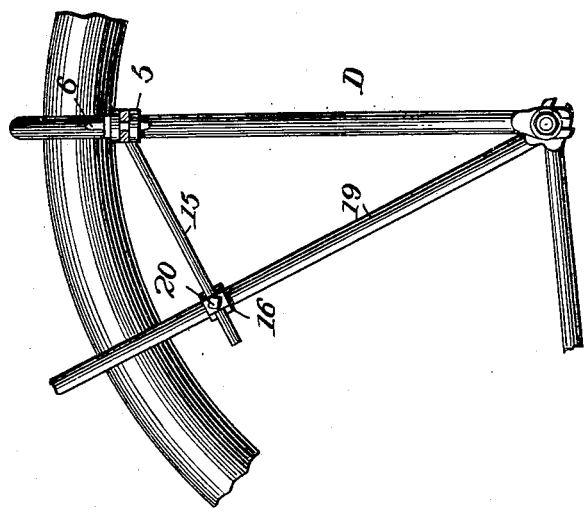
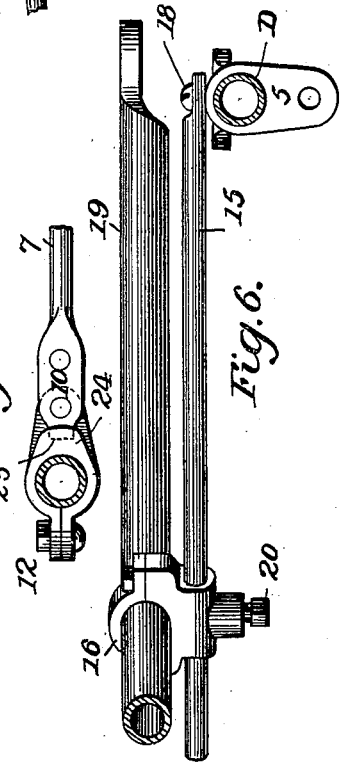
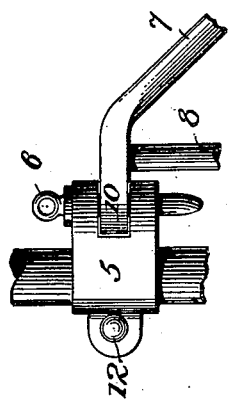
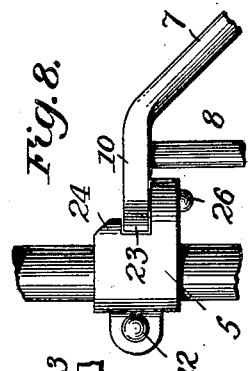
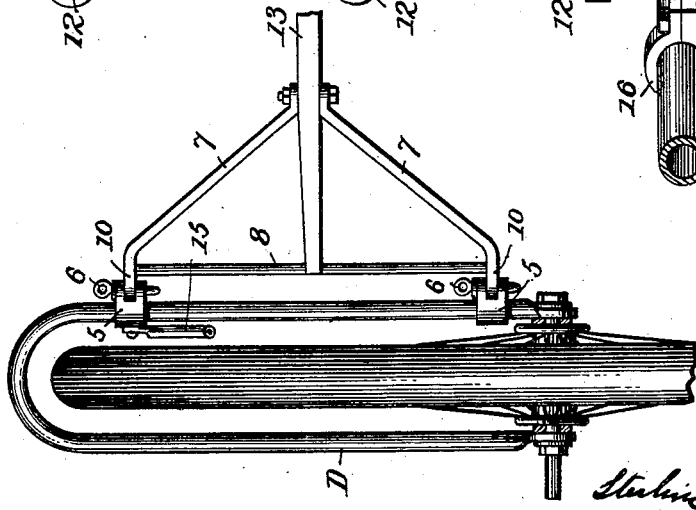
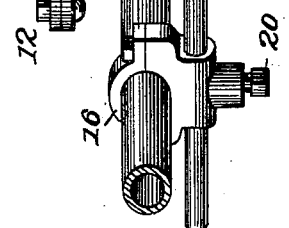
Witnesses Inventor
Sterling Elliott
Attorneys

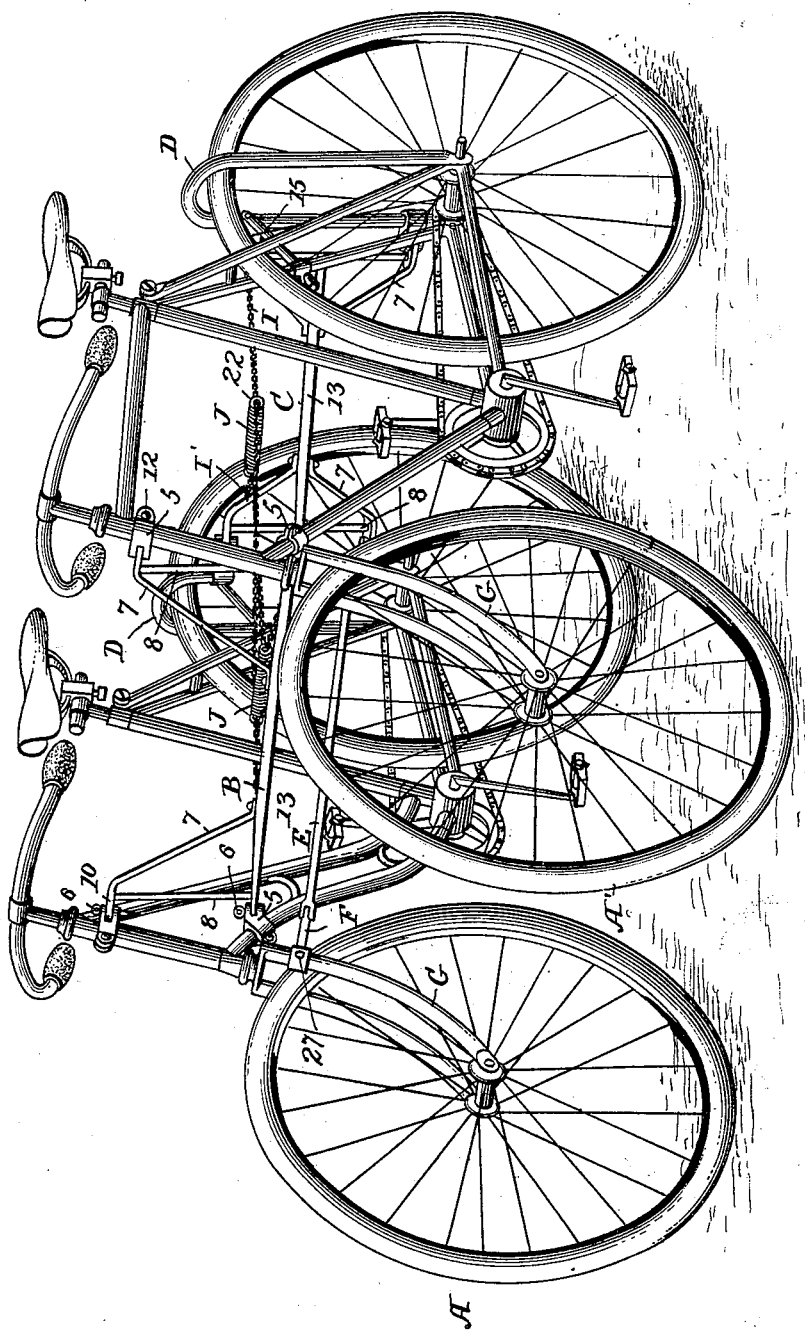

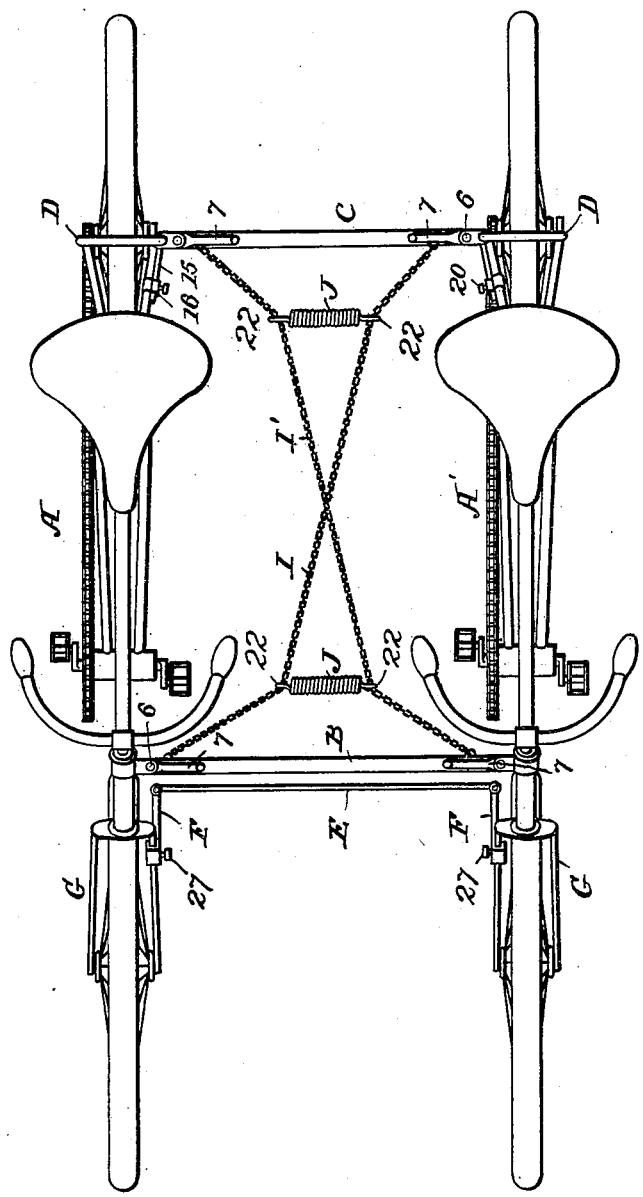

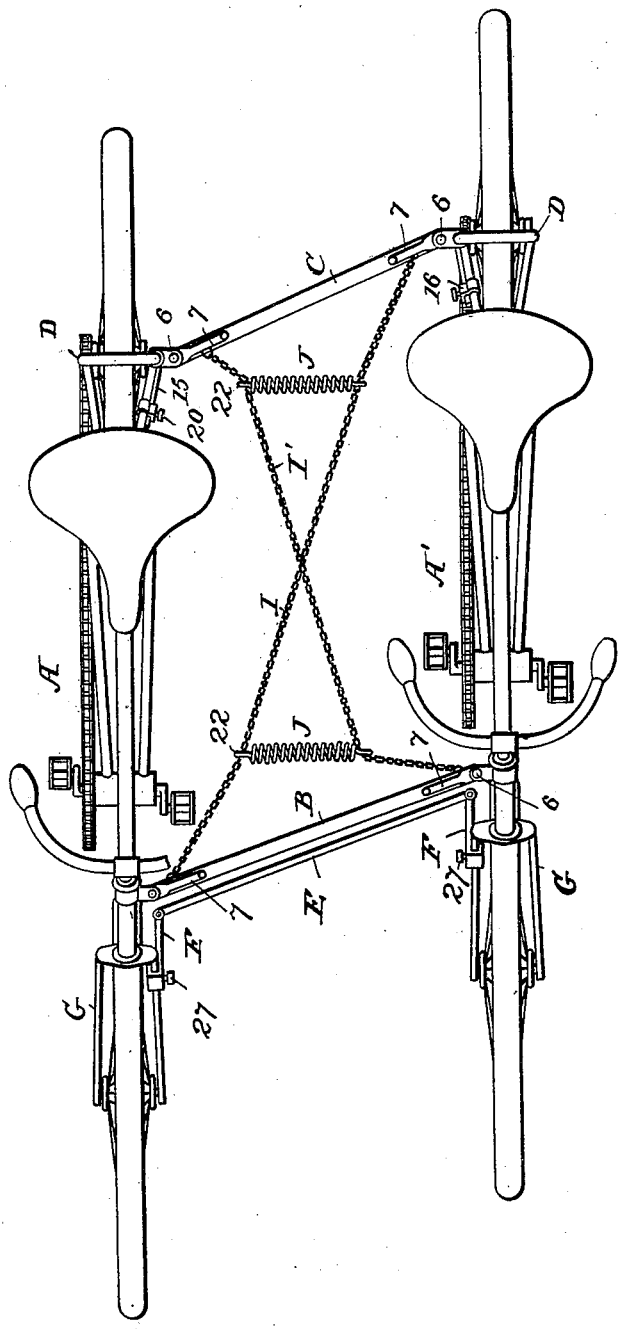

UNITED STATES PATENT OFFICE.

STERLING ELLIOTT, OF BOSTON, MASSACHUSETTS.

DEVICE FOR COUPLING BICYCLES.

SPECIFICATION forming part of Letters Patent No. 676,535, dated June 18, 1901.

Application filed December 6, 1897. Serial No. 660,870. (No model.)

*To all whom it may concern:*

Be it known that I, STERLING ELLIOTT, a citizen of the United States, residing at Boston, in the county of Suffolk and State of Massachusetts, have invented certain new and useful Improvements in Devices for Coupling Bicycles, of which the following is a specification.

My invention relates to that class of devices intended to couple two adjacent bicycles together; and the object of my invention is to provide a coupler which will hold two bicycles with reference to each other laterally, maintain them vertically in proper alinement, so that neither can tip to one side or the other, and yet allow perfect freedom of fore-and-aft movements within certain limits, so that each rider need exert only the force necessary to drive the particular bicycle which he rides, thus avoiding the tiresome work of attempting to ride two bicycles which are coupled rigidly, while also avoiding the annoyances incident to that class of couplings which connect the bicycles side by side, yet do not prevent independent tilting or swinging movements.

In carrying out my invention I provide two girders and means for connecting the same at the opposite ends to opposite bicycles, substantially as set forth hereinafter and as illustrated in the accompanying drawings, in which—

Figure 1 is a perspective view illustrating two bicycles provided with my improved coupling attachment. Fig. 2 is a plan view of Fig. 1, the two bicycles being side by side. Fig. 3 is the same as Fig. 2, one bicycle in advance of the other. Fig. 4 is a rear view of one of the wheels, showing the yoke attachment at one end of one of the girders. Fig. 5 is a side view of the parts shown in Fig. 4. Fig. 6 is a plan view, enlarged, of the parts shown in Fig. 5. Fig. 7 is a detached view of one of the pivotal connections. Fig. 8 is a detached view showing a modified form of the pivotal connection, and Fig. 9 is a plan of Fig. 8.

The two bicycles A A' to be coupled may be of any suitable construction. Between these bicycles extend the frames or girders B C. These may be constructed of any suitable light material in any suitable form, but in such manner that each end of each girder preferably has two bearings or points of connection to afford pivotal connection with the adjacent bicycle at two points, one above the other, so that when the girders are in place they not only connect the two frames of the two bicycles, so that they cannot move to or from each other laterally, but they also keep them in vertical alinement—that is, neither of the bicycles can tilt to either side independently of the other; nor is it possible for either of them to swing out of vertical position to any material extent. Any suitable mode of pivotally connecting the ends of the girders to the adjacent bicycle may be employed. As shown, I provide ears or clips 5, constituting couplings so constructed as to receive part of the frame of the machine—as, for instance, the front bar or reach or back bar— and each provided with a pivot 6, shown as in the form of a detachable pin in the drawings, except Figs. 8 and 9, passing through perforated ears or lugs 10 at the ends of the girders.

Preferably each coupling 5 consists of two parts recessed to receive one of the bars between them and with screw-bolts 12, clamping these parts to the frame. This construction also permits the couplings to be adjusted to any desired position; but it will be evident that the couplings may be otherwise constructed and secured fixedly or adjustably, as desired.

In the construction of the front girder C which is illustrated there is a cross-bar 13, a vertical end bar 8, and a diagonal brace 7. In the construction of the rear girder there are the same parts, with the exception that the vertical bar 8 extends through the girder and below the same, and there is an additional lower brace 7, as shown.

It will be evident that it is desirable that the pivotal points at each end of each girder shall be nearly upon a vertical line. This can be secured at the front end by connecting one of the couplings—that is, the upper coupling—to the front bar of the frame and the lower coupling to the reach. While the same arrangement of the pivotal connections might be secured by attachment to different parts of the rear frame, I prefer to supplement the latter by supplemental frames D D.

These may be of any suitable form and connected in any suitable way to the main frames; but, as shown, each consists of a yoke with flat perforated ends adapted to receive the ends of the stationary shaft about which the rear wheel turns and to be connected thereto by means of nuts, as shown, or otherwise. Each yoke may be braced by a brace 15, connected at any suitable point with the ear by means of a screw-bolt 18 and passing at the opposite end through a socket in a coupling-piece 16, clamped upon one of the rear bars 19 of the frame and adjustable thereon. A set-screw 20 serves to bind the brace 15 in its sockets in the coupling-piece 16. The brace serves to maintain the yoke rigidly in place, and to either arm of each yoke are clamped the coupling-pieces 5 5, to which are pivotally connected the ends of the rear girder.

While the attachment above described employed to connect bicycles would serve to preserve their vertical alinement, to maintain them at the required distance apart, and permit one to move fore and aft independent of the other, it would be advantageous to interpose some kind of yielding resistance to the fore-and-aft movement which would while permitting all necessary independence of movement in this respect maintain a certain unison of action between the two bicycles. I therefore provide means whereby a certain amount of yielding resistance is interposed if one wheel advances in front of the other to any material extent. While any suitable spring arrangement connected with the bearings might serve to put springs under tension upon the advance of one wheel in front of the other, I prefer to make use of diagonal cable braces I I', each cable connected at its forward end to the forward girder, near one end of the same, and crossing the latter, and connected at its rear end to the rear girder, near one end of the same. Springs might be interposed in the lines of these cables; but I have found that a better resistance to the too great forward movement of either bicycle may be secured by making use of two springs J J, extending transversely between the two cables and each having an eye 22 at each end, through which the cables may pass, so that while the springs serve to draw the cables together there is a fixed connection of each cable with the spring, permitting the cables to assume the position shown in Fig. 3 without unduly drawing the springs out of their lateral positions, but distending them so that the springs will exert a tendency to resist any movement carrying one wheel ahead of the other without actually preventing it when sufficient force is applied.

It will be evident to any one familiar with the operation of bicycles that the latter do not, as a general thing, move at a uniform rate of motion, but that during each revolution of the pedal-shaft there is more or less variation, resulting in what would be, if distinguishable, a series of impulses rather than a continuous movement. While these are not distinguishable ordinarily, yet when two bicycles are rigidly coupled together the effect of the variation of movement is very perceptible. By the flexible connection above described, while I can prevent any too great forward movement of one wheel independently of the other, there is still left abundant opportunity for individual action and variation of movement between the two wheels without any restraint of one upon the other or one in any way affecting deleteriously the movement of the other.

It will be evident that when the bicycles are to be uncoupled this may be readily done by taking out the detachable coupling-pins 6, passing through the coupling-pieces 5 and through the ears 10 of the girders. In some instances it is undesirable to have loose pins owing to the tendency of the same to rattle and also liability to get lost, and to avoid these objections I make use in some instances of the construction shown in Figs. 8 and 9, where the lug 10 has a lip 23, which extends under a lip 24 upon the coupling 5. A pin 26 extends from the lug 10 through an opening in an ear of the coupling-pin. By swinging the girder to an extreme position at an angle to the frame the lip 23 can be carried from beneath the lip 24 and permit the pin 26 to be drawn out of the ear.

When bicycles are coupled as above set forth, it is desirable that one of the steering-wheels shall swing in unison with the other. To secure this result, I make use of a coupling-bar E, pivoted at the ends to two arms F F, each of which has at the end a clamp or socketed terminal provided with a binding-screw 27, by means of which it may be connected with one of the horns of the usual fork G, as shown in Fig. 3. By this means any movement of one fork is transferred to the other.

It will be evident that if the upper and lower pivots at each end of each girder were prolonged until they met this long pivot would yet constitute pivotal connections at separated points, securing the same result as two separate pivots.

Without limiting myself to the precise construction and arrangement of parts shown, I claim as my invention—

1. The combination in a coupling for bicycles, of pivoted connecting bars or girders, and flexible spring connections extending diagonally between the ends of said bars or girders, substantially as described.

2. The combination in a coupling attachment for bicycles, of two cross bars or frames, and means for pivotally connecting their ends to the frames of opposite bicycles, cables extending diagonally between the frames, and springs having connections at their ends with said cables, substantially as described.

3. The combination of two bicycles and connecting frames or girders with vertical pivots in different planes arranged to preserve the bicycles parallel vertically, substantially as set forth.

In testimony whereof I have signed my name to this specification in the presence of two subscribing witnesses.

STERLING ELLIOTT.

Witnesses:
 FRANK G. PARKER,
 M. R. MAGUIRE.